United States Patent
Karulkar et al.

(10) Patent No.: US 10,700,323 B2
(45) Date of Patent: Jun. 30, 2020

(54) APPARATUS FOR DIRECTED VENT GAS EXPULSION IN BATTERY CELLS

(71) Applicant: Ford Global Technologies, LLC, Dearborn, MI (US)

(72) Inventors: Mohan Karulkar, Dearborn, MI (US); Andrew Robert Drews, Ann Arbor, MI (US); Brian Joseph Robert, St. Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 15/684,484

(22) Filed: Aug. 23, 2017

(65) Prior Publication Data

US 2019/0067659 A1 Feb. 28, 2019

(51) Int. Cl.
| | |
|---|---|
| *H01M 2/12* | (2006.01) |
| *H01M 2/02* | (2006.01) |
| *H01M 10/647* | (2014.01) |
| *H01M 10/6556* | (2014.01) |

(52) U.S. Cl.
CPC ......... *H01M 2/1252* (2013.01); *H01M 2/021* (2013.01); *H01M 2/0212* (2013.01); *H01M 2/1223* (2013.01); *H01M 2/1235* (2013.01); *H01M 2/1241* (2013.01); *H01M 10/647* (2015.04); *H01M 10/6556* (2015.04); *H01M 2200/10* (2013.01); *H01M 2200/20* (2013.01); *H01M 2220/20* (2013.01)

(58) Field of Classification Search
CPC ............. H01M 2/1252; H01M 2/1223; H01M 2200/10; H01M 2220/20
USPC .................................................. 429/210
See application file for complete search history.

(56) References Cited

U.S. PATENT DOCUMENTS

| | | | |
|---|---|---|---|
| 6,143,440 A * | 11/2000 | Volz ............... | H01M 2/1044 429/100 |
| 6,296,967 B1 | 10/2001 | Jacobs et al. | |
| 6,743,546 B1 | 6/2004 | Kaneda et al. | |
| 8,518,569 B2 | 8/2013 | Murphy et al. | |
| 9,023,503 B2 | 5/2015 | Seong et al. | |
| 9,276,242 B2 | 3/2016 | Dämon et al. | |
| 9,379,365 B2 | 6/2016 | Schmieder et al. | |
| 9,385,404 B2 | 7/2016 | Yoon et al. | |
| 2006/0234119 A1 | 10/2006 | Kruger et al. | |
| 2008/0171259 A1 | 7/2008 | Kanai et al. | |
| 2011/0003185 A1 | 1/2011 | Kritzer | |
| 2012/0107663 A1 | 5/2012 | Burgers et al. | |
| 2013/0095352 A1 | 4/2013 | Yamauchi et al. | |
| 2013/0122336 A1 | 5/2013 | Park et al. | |

(Continued)

FOREIGN PATENT DOCUMENTS

| | | |
|---|---|---|
| GB | 2537431 A | 10/2016 |
| WO | 2016083144 A1 | 6/2016 |

*Primary Examiner* — Gary D Harris
(74) *Attorney, Agent, or Firm* — David Kelley; Brooks Kushman, P.C.

(57) ABSTRACT

A battery system is disclosed. The system may include a frame surrounding a battery active region and defining a vent carried by the frame and mounted between the battery active region and coolant passage. The vent may be configured to vent gas from the battery active region to the coolant passage responsive to a pressure or temperature of the gas exceeding a predetermined threshold, and to isolate the battery active region from the coolant passage otherwise.

6 Claims, 2 Drawing Sheets

(56) References Cited

U.S. PATENT DOCUMENTS

| | | |
|---|---|---|
| 2013/0157099 A1 | 6/2013 | Anderson |
| 2013/0280596 A1 | 10/2013 | Lee et al. |
| 2014/0103880 A1 | 4/2014 | Schaefer et al. |
| 2014/0147712 A1 | 5/2014 | Lee |
| 2014/0248515 A1 | 9/2014 | Wayne et al. |
| 2015/0037662 A1 | 2/2015 | Pinon et al. |
| 2015/0171411 A1 | 6/2015 | Kobayashi et al. |
| 2015/0270516 A1* | 9/2015 | Mcleskey .......... H01M 10/6556 429/83 |
| 2016/0036024 A1 | 2/2016 | Choi et al. |
| 2016/0093857 A1 | 3/2016 | DeKeuster et al. |
| 2016/0204398 A1 | 7/2016 | Moon et al. |
| 2016/0248135 A1 | 8/2016 | Kim et al. |
| 2016/0254504 A1 | 9/2016 | Kim et al. |
| 2016/0293926 A1 | 10/2016 | Yamada |
| 2017/0317324 A1 | 11/2017 | Westermeier et al. |
| 2019/0067659 A1 | 2/2019 | Karulkar et al. |

\* cited by examiner

APPARATUS FOR DIRECTED VENT GAS EXPULSION IN BATTERY CELLS

TECHNICAL FIELD

The present disclosure relates to the field of batteries and battery modules.

BACKGROUND

Hybrid vehicles typically include a high voltage battery pack adapted to provide power to various components of the vehicles, including motors, transmissions, and electrical accessories. A battery pack may consist of various chemistries, such as lithium ion, nickel metal hydride, or nickel cadmium. The battery pack may also include multiple cells connected in series, parallel, or a combination thereof. Each cell may include a cathode, an anode, and an electrolyte. The electrolyte is a medium that allows the electrical charge to flow between the anode and the cathode. It is the electrochemical reactions that occur within the cell that allows a battery pack to serve as an energy source.

The performance of the battery packs may degrade overtime because of cell decomposition or abuse conditions, including but not limited to overcharging, internal shorting, external shorting, and over-discharge, among others. Gas build-up and subsequent increase in pressure within a cell may occur from the decomposition of the cells or the abuse conditions. The increase in pressure may occur relatively slowly due to decomposition of the cell over the cell's life. Or the increase in pressure may occur rapidly in response to a temperature increase in the cell. Depending on the battery type, cell venting may be characterized by the cell being pressured, discharge of gases from the cell, such as vaporized solvents, or propulsion of the electrolyte out of the cell. Some batteries may include vent ports to accommodate the pressure, gas release, or electrolyte being propelled out of the cells.

SUMMARY

According to one embodiment of this disclosure, a battery system is disclosed. The system may include a frame surrounding a battery active region and defining a vent carried by the frame and mounted between the battery active region and coolant passage. The vent may be configured to vent gas from the battery active region to the coolant passage responsive to a pressure or temperature of the gas exceeding a predetermined threshold, and to isolate the battery active region from the coolant passage otherwise.

According to another embodiment of this disclosure, a battery system is disclosed. The system may include a hollow frame surrounding a battery active region, first and second pliable sheets, and a first vent. The first and second pliable sheets may be attached to opposite sides of the hollow frame to enclose the battery active region. The first vent may be mounted to the hollow frame and configured to vent gas from the battery active region to inside the hollow frame responsive to a pressure or temperature of the gas exceeding a first predetermined threshold.

According to yet another embodiment of this disclosure, a battery system is disclosed. The system may include a hollow frame surrounding a battery active region, a gas adsorbing material contained by the hollow frame and a first vent. The first vent may be carried by the hollow frame and configured to vent gas from the battery active region to the gas adsorbing material contained by the follow frame responsive to a pressure or temperature of the gas exceeding a first predetermined threshold.

BRIEF DESCRIPTION OF THE DRAWINGS

FIG. 1-A is a cross-sectional view taken along the lines 1-A in FIG. 2.

DETAILED DESCRIPTION

Figure 1:
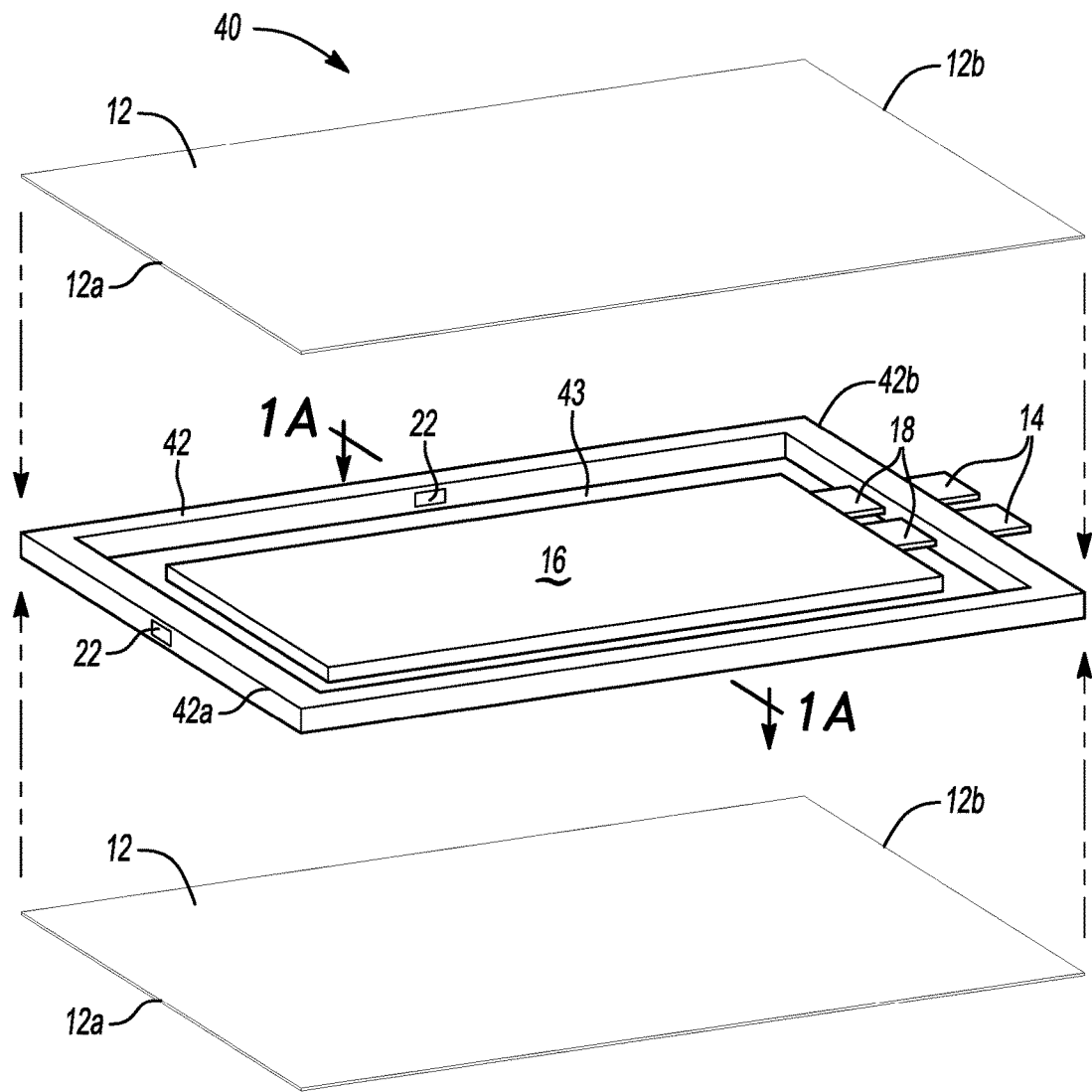
FIG. 1 is an exploded view of a battery cell according to one embodiment of this disclosure.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

With mass-production of batteries, a variety of battery formats have been developed. Example battery formats include cylindrical cells, button cells, prismatic cells, frame cells, and pouch cells. The pouch cell design represents an efficient use of space and achieves about 90-95% packaging efficiency. Instead of using a metallic cylinder and glass-to-metal electrical feed-through, conductive foil tabs are typically welded to the electrodes and are fully sealed while extending outside of the pouch. By eliminating a metal enclosure, the weight of the pouch cell is reduced. Frame cells may include a rigid plastic frame and pliable polymeric sheets that enclose the frame or adhered to a top and bottom surface of the frame.

While a pouch cell is a lightweight solution to the battery design, the pouch format presents a number of considerations such as requirement for support and space to expand. Additional concerns are exposure to humidity and high temperatures which may shorten life of the cell. Swelling represents yet another concern, for example swelling by up to 8-10% over 500 cycles may be typical with some types of pouch cells. Yet, pouch cells have become popular, especially in the same performance criteria as cylindrical cells. Pouch cells have been successfully utilized in consumer, military, as well as automotive applications. Relatively large flat pouch cell packs have been applied in electric powertrains and energy storage systems. Relatively small pouch cells have been used for portable applications with high load current requirements.

Battery cells may be enclosed or surrounded by a pouch or a rigid frame. As the cell of the battery begins to decompose or deteriorates, gas generated within the active region may create a build of pressure. The pouch cells or frame cells may not generally include a dedicated gas vent which could release gasses formed by reactions between the electrolyte solvent and the active materials. Pouch cells are usually constrained between pressure plates to ensure that an increase of internal pressure caused by gas generation puts the greatest stress on the seams and encourages controlled gas release in a fault condition. Yet, experience from cell testing suggests that the location and distribution of the gas release may not occur in a predictable manner at consistent pressures or locations. It is advantageous to develop a secondary containment structure, capable of venting the gas in a predictable manner and location. Moreover, it may be advantageous to provide a gas adsorbing material within a portion of the cell or incorporate the venting mechanism within a battery cooling apparatus for a battery cell.

Referring to FIG. 1, an exploded view of a battery cell 40 is illustrated. The cell 40 includes the outer pouch or sheet 12 that surrounds or is adhered to a frame 42. The frame 42 may be comprised of a rigid plastic material including thermoplastic, thermoset plastics, or polymers. Or the frame may be comprised of a fiber reinforced material. Fiber-reinforced plastics (also known as fiber-reinforced polymers) are composite materials made of a polymer matrix reinforced with fibers. The fibers may be glass, carbon, basalt, aramid or other appropriate reinforcing materials. The polymer may be an epoxy, vinyl ester, polyester thermosetting plastic, phenol formaldehyde resin, or other appropriate polymer or plastic. Fiber-reinforced plastics may also be heat and/or pressure cured.

While the frame 42 shown is rectangular, it may have other suitable shapes. The frame 42 defines an inner aperture 43 that surrounds an active region 16 and the two electrodes (not depicted) of the battery cell 40. The term battery active region 16 may contain an anode, cathode, electrolyte, and separator layers in an organized configuration (wound, z-fold, stacked, etc.) connected to respective external electrode terminals 14. The battery terminals 14 extend from within the aperture 43 of the frame 42 through the outer pouch 12. The outer pouch 12 includes a first sheet positioned at the top of the page and a second sheet positioned at the bottom of the figure. Each sheet includes four outer edges 12a-12d that are aligned with the four outer edges 42a-42d of the frame 42. The first and second sheets of the outer pouch 12 may be heat sealed to the frame 42 along the edges 42a-42d. The edges 42a-42d, or 12a-12d, or both may include thermally activated adhesives or other suitable materials for sealing. In other embodiments, the edges may be sealed by induction sealing, induction welding, or ultrasonic welding or other suitable sealing or fastening means.

The frame 42 may include at least one ventilation device 22 in one or more portions of the frame that defines the aperture 43. A ventilation device 22 may be disposed within or fixed to the inner periphery of the frame member 42. The ventilation mechanism 22 may also be disposed within an outer portion of the frame 42 as shown on the left side of the figure. In other embodiments, the frame 42 may define a hole or an aperture (not illustrated) that is smaller than ventilation device 22. In that case, the ventilation device may lay over the aperture, so that it is adhered or connected to an area surrounding the hole or aperture. The ventilation device 22 may be a pressure-sensitive burst seal that permits the release of gas from the aperture 43 through the seal 22, once the pressure within the aperture 43, defined by the frame 42, surpasses a predetermined pressure. The pressure-sensitive burst seal may be attached to the inner pouch by an adhesive or other suitable means. In one or more embodiments, the burst seal may include a perforated section that is designed to burst at the predetermined pressure. Additionally, the seal may be a valve, such as a check valve, clack valve, non-return valve, or one-way valve. In one or more embodiments, the ventilation device 22 may be a temperature-sensitive burst seal. A temperature sensitive burst seal may break or burst when the temperature within the aperture 43 or frame 42 reaches a predetermined temperature. In other embodiments, the ventilation device may be a burst seal that is both temperature and pressure sensitive.

Figure 1A:
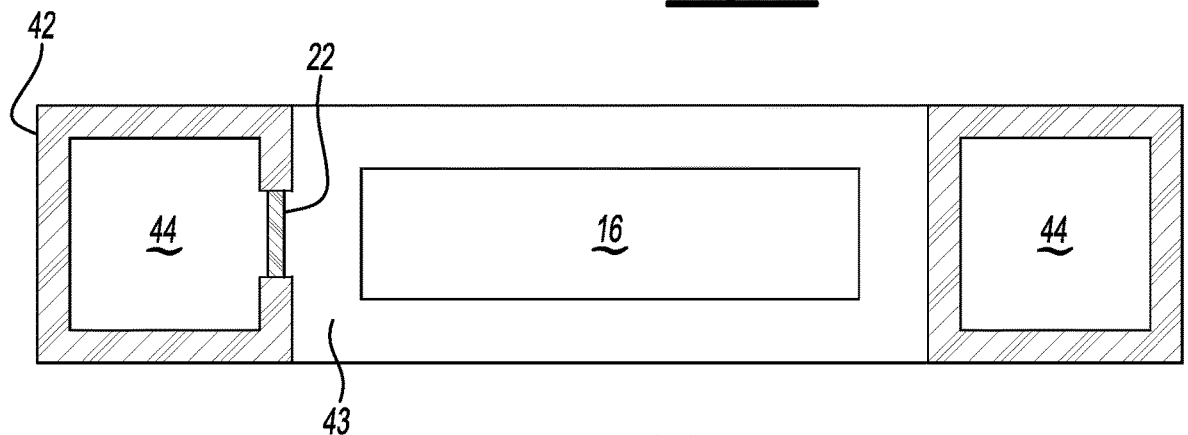

If the ventilation device 22 releases gas from the aperture 43 to the outer pouch 12, the gas is then captured by cavity 44 (FIG. 1A). The ventilation device may be designed so that it vents or releases gas at a predetermined rate to prevent an accumulation of pressure within the aperture 43 too quickly. Alternatively, the ventilation device may allow a rapid release of gas from the aperture 43 to the cavity 44 defined by the frame 42. The ventilation device 22 may stop the flow of gas from the aperture 43 to the cavity 44 defined by the frame 42 once the pressure or temperature within the aperture 43 and cavity 44 are the same. As will be described in greater detail below, the ventilation device 22 may be placed within or on a hole or aperture of the inner periphery or outer periphery of the frame 43, or both.

The frame may be hollow and define an internal space or cavity 44 (FIG. 1-A). The ventilation device that is arranged within the inner periphery of the frame 42 may allow gas generated by the active region 16 into the cavity 44. The cavity 44 may include a gas adsorbing or gas harvesting material (not shown). The gas adsorbing or gas harvesting material may be disposed within the cavity defined by the frame throughout the entire cavity or only a portion of the cavity. The gas adsorbing or gas harvesting material may include vermiculite, Metal-Organic Frameworks (MOFs), activated carbon, or other suitable materials. The material may be homogenous or some combination of the materials just described. A second ventilation device 22' may also be disposed on an outer periphery or portion of the frame 42. The second ventilation device 22' may release or permit gas within the cavity 44 of the frame 42 to an external area surrounding the frame 42. The second ventilation device 22' may be positioned adjacent to a duct or an area of the vehicle to direct the gas away from the cell to prevent an accumulation of gas towards the ground. If more than one ventilation device 22 is utilized, they each may be configured to allow for proportional venting. For example, the ventilation device 22 may have a threshold that is less than or greater than a threshold defined by the second ventilation device 22'.

Figure 2:
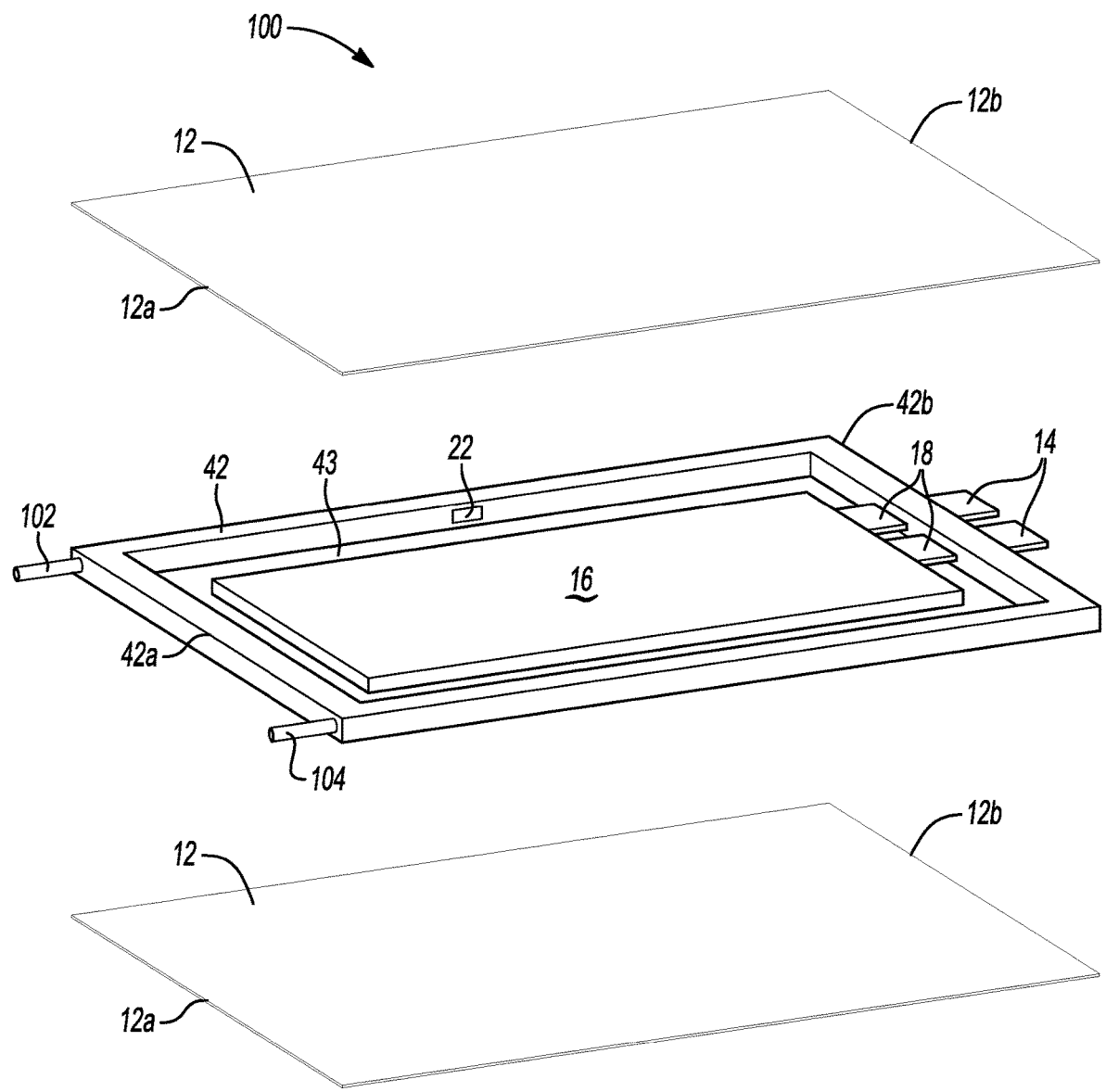
FIG. 2 is an exploded view of an exemplary battery cell according to another embodiment of this disclosure.

Referring to FIG. 2, an exploded view of a battery cell 100 according to another embodiment, is illustrated. The battery cell 100 is substantially similar to the battery cell 40 described above. But here the battery cell 100 incorporates a battery coolant system within the frame 42. The coolant system includes a coolant inlet 102 and a coolant outlet 104. A coolant channel 106 may extend between the coolant inlet 102 to the coolant outlet 104. The coolant channel 106 may be integrally formed by the frame, similar to the cavity 44 shown in FIG. 1-A, or it may be a separate pipe or line that is inserted within the cavity 44 of the frame. The coolant channel or channels may be arranged along a periphery of the frame 42. In other embodiments, the channels 106 may be bifurcated to include two branches. The fluid may be a coolant such as air, oxygen, water, or another liquid coolant. Alternatively, the fluid may provide heat to the cell 100. Alternatively still, the channel 106 may serve for both heating and cooling.

To regulate to temperature of the cell 100, coolant may be pumped or sent through the coolant inlet 102 that extends through the frame 42 before terminating at the coolant outlet 104. The coolant may be a fluid or gaseous material such as air, oxygen, water, or some mixture thereof. Alternatively, the fluid may provide heat to the cell 100. Alternatively, the coolant system may serve for both heating and cooling. As previously described, the ventilation device 22 may be disposed within a portion of the frame that defines the aperture 43. The ventilation device 22 vents gas into the coolant channel so that it is then carried by the coolant flowing through the coolant channel or cavity until the coolant and gas mixture is then dispelled from the frame and aperture 43.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A battery system comprising: a frame surrounding a battery active region and defining a coolant passage; an inlet extending from a first portion of the frame and terminating at the coolant passage; an outlet extending from a second portion of the frame and terminating at the coolant passage; and a vent carried by the frame and mounted between the battery active region and coolant passage, and configured to vent gas from the battery active region to the coolant passage responsive to a pressure or temperature of the gas exceeding a predetermined threshold, and to isolate the battery active region from the coolant passage otherwise, wherein coolant passage, the inlet and the outlet are arranged so that coolant received from the inlet carries the vented gas through the coolant passage to the outlet.

2. The battery system of claim 1, wherein the vent is configured to vent the coolant from the coolant passage to the battery active region responsive to the pressure or temperature of the gas exceeding the predetermined threshold.

3. The battery system of claim 1, wherein the coolant passage is configured to route coolant around a perimeter of the battery active region to carry heat away therefrom.

4. The battery system of claim 1, further comprising first and second pliable sheets attached to opposite surfaces of the frame to encase the battery active region.

5. The battery system of claim 1, wherein the vent is a temperature-sensitive burst membrane.

6. The battery system of claim 1, wherein the vent is a one-way pressure valve.

* * * * *